Oct. 8, 1957            G. A. LYON            2,809,318
WHEEL STRUCTURE WITH BRAKE DRUM COOLING MEANS
Filed Sept. 23, 1954            2 Sheets-Sheet 1

Inventor
GEORGE ALBERT LYON

Oct. 8, 1957 — G. A. LYON — 2,809,318
WHEEL STRUCTURE WITH BRAKE DRUM COOLING MEANS
Filed Sept. 23, 1954 — 2 Sheets-Sheet 2

Inventor
GEORGE ALBERT LYON

United States Patent Office 2,809,318
Patented Oct. 8, 1957

2,809,318

WHEEL STRUCTURE WITH BRAKE DRUM COOLING MEANS

George Albert Lyon, Detroit, Mich.

Application September 23, 1954, Serial No. 457,899

12 Claims. (Cl. 188—264)

The present invention relates to improvements in wheel structures and more particularly concerns novel means for positively effecting brake drum cooling air circulation through vehicle wheels.

Since the modern trend in automobiles is toward heavier vehicles, more powerful motors, while at the same time larger tires are used and thereby wider tire rims and smaller diameter wheels, a substantial problem in overheating of the vehicle brakes is created. The more powerful brakes required for safe operation of the heavier and speedier automobiles have larger braking surfaces and thus create more frictional heat in operation. In view of the fact that the brakes are housed in a drum associated with each wheel within the generally cupped inner side of the wheel where the brake drum is actually encompassed by the wheel direct slip stream cooling of the brake drum is precluded. At high speed operation centrifugal force tends to drive the air within the perimeter of the wheel radially outwardly at both the inner and outer sides of the wheel which tends to draw the air away from the brake drum, and from the nature of the compact structures within the wheel about and adjacent to the brake drum inadequate inflow of air from the slip stream for adequately cooling the brake drum will find its way to the brake drum.

It is accordingly an important object of the present invention to provide improved means for effecting brake drum cooling.

Another object of the invention is to provide improved means for effecting brake drum air circulation through a vehicle wheel from the front of the wheel to the back of the wheel.

A further object of the invention is to provide improved means in a vehicle wheel structure for effecting brake drum cooling air circulation in either a front to back or a back to front direction, depending on preferences or operating requirement for particular installations.

Still another object of the invention is to provide an improved brake drum air circulation cooling ring structure for assembly with a vehicle wheel and brake drum.

Yet another object of the invention is to provide an improved brake drum structure.

A still further object of the invention is to provide an improved wheel structure having a novel relationship of wheel cover and brake drum air circulation promoting means.

Other objects, features and advantages of the present invention will be readily apparent from a detailed description of a preferred embodiment thereof taken in conjunction with the accompanying drawings in which.

Figure 1:
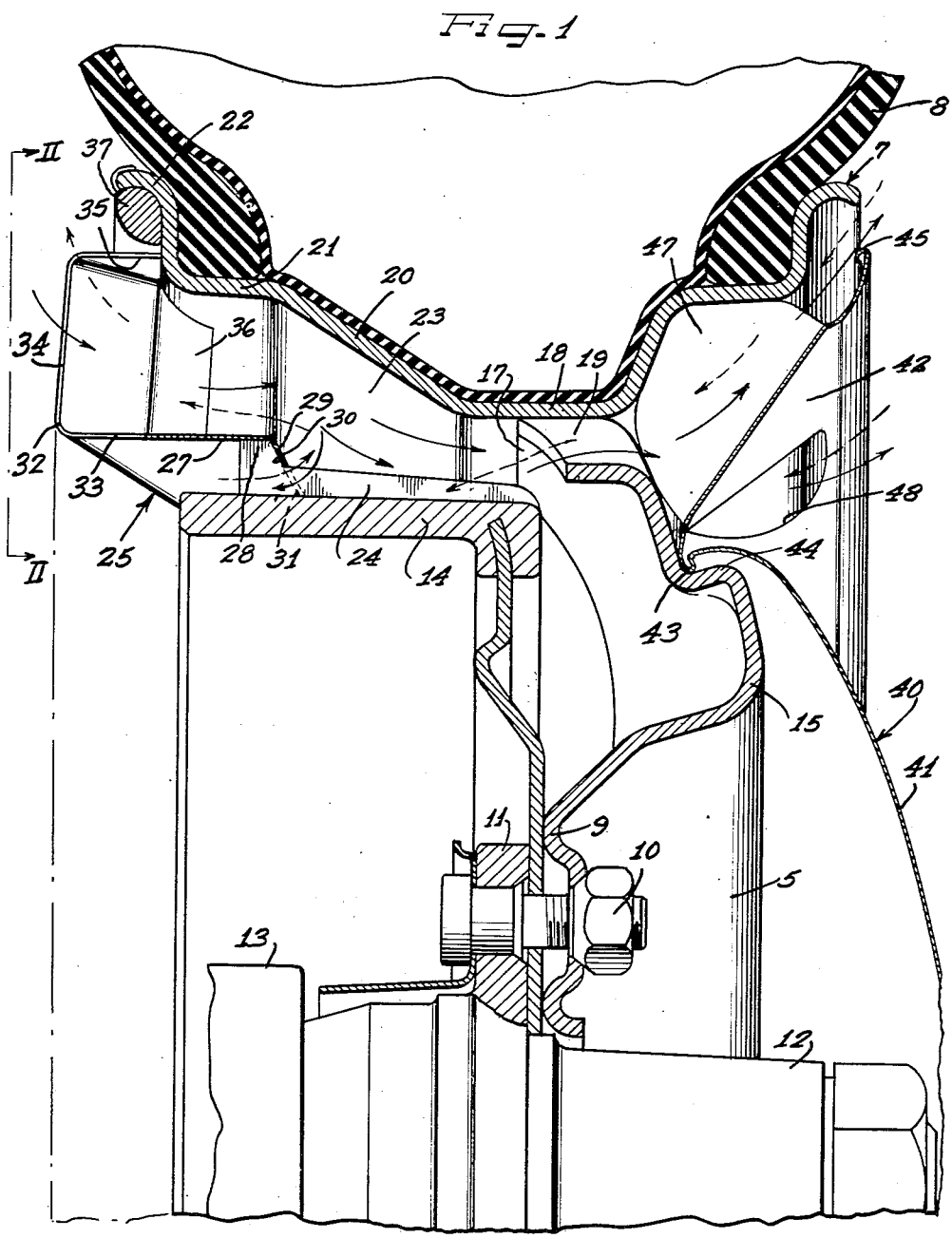
Figure 1 is a fragmentary radial sectional view through a vehicle wheel, certain parts being in elevation, showing the invention applied thereto.

A wheel structure with which the present invention is concerned includes a wheel body 5 supporting a tire rim 7 of the multi-flange drop center type adapted to support a pneumatic tire and tube assembly 8.

At its center the wheel body 5 has a dished bolt-on flange 9, hinged to be secured as by means of bolts 10 to a lateral flange 11 of a vehicle hub 12 to be supported rotatably by an axle or spindle structure 13. The flange 11 also carries a brake drum 14.

Radially outwardly from the bolt-on flange 9 the wheel body 5 has an annular axially outwardly directed nose bulge 15, while at its outer periphery the wheel body has an attachment flange 17 secured in a suitable fashion to a base flange 18 of the tire rim. At suitable intervals such as 4, the the attachment flange 17 is inset to provide openings 19 through the wheel.

At the outer side of the wheel, the tire rim 7 has the usual stepped flange structure extending generally radially axially outwardly. At the inner side of the wheel the tire rim is provided with a side flange 20 extending generally axially inwardly and radially outwardly from the base flange 18 to substantial width and merging with an inner intermediate flange 21 that extends axially inwardly and merges with an inner generally radially outwardly and then axially inwardly directed terminal flange 22.

It will be observed that the wheel body 5 and the inner portion of the tire rim 7 provide an inner substantially cup-shaped chamber within which the brake drum 14 is located, in the present instance completely encompassed by the tire rim. There is a substantial annular gap 23 about the periphery of the brake drum within the tire rim and with which gap the wheel openings 19 communicate. Thereby air may circulate about the brake drum and through the wheel openings.

For improving heat dissipation from the brake drum 14, its outer periphery is preferably provided with a series of generally axially extending and radially outwardly projecting integral fins 24.

However, due to its completely encompassed relation to the tire rim, the brake drum 14 is unfavorably disposed for adequate air circulation in service and more particularly during high speed travel of the wheel. Therefore, means are provided for positively effecting movement of brake drum cooling air through the gap 23. Herein such means comprise a ring member 25 cooperative with the brake drum 14 and the tire rim at the inner side of the gap 23 for positively moving air in an axial direction through the wheel in the rotation of the wheel.

According to the present invention, the air circulation ring member 25 includes a tubular body 27 of sheet metal which is preferably of an inside diameter to fit in centered relation about the brake drum 14 and more particularly in slideably assembled relation about radially outwardly projecting inner terminal extensions 28 on the brake drum ribs 24. At its axially outer margin the ring body 27 has an annular continuous generally radially inwardly directed flange 29 which is engageable with generally axially outwardly facing stop shoulders 30 provided on the rib extensions 28. Thereby, the ring member 25 can be assembled about the brake drum 14 before the wheel is attached to the axle flange 11. To do this the ring member 27 is moved axially inwardly over the brake drum 14 until the flange 29 stops against the shoulders 30. To facilitate this assembly action, it will be noted from Figure 1, that the ribs 24 taper toward the axially outer side of the brake drum for clearance purposes.

Unintentional axially outward disassembly of the ring member 25 from the brake drum, as for example when the wheel is removed from the assembly for changing a tire or the like, is prevented by spaced retaining finger extensions 31 on the flange 29 of a length to fit between respective pairs of the ribs 24 into endwise thrust gripping engagement with the perimeter of the brake drum. Only a few of the retaining fingers 31 need be provided and they may be substantially narrower than the space between the ribs 24. Furthermore, the fingers 31 will preclude any substantial relative turning of the ring member 25 on the wheel since should there be a tendency for the ring to turn due to torque forces in service the sides of the fingers 31 will come to a stop against the respective adjacent rib 24 toward which the ring may tend to turn.

For effecting movement of air, the ring member 25 is provided with a uniform series of combination aspiration and blower vanes 32. Each of the vanes is constructed as a bent over extension from the ring body 27. To this end each of the vanes is of generally scoop-shape having a side wall 33 extending from the tubular body 27 and merging with a radially outwardly directed circumferentially angularly obliquely disposed inner or crown wall 34 for overlying the outer side of the gap 23 and provided with an axially outwardly directed radially outer side wall 35 having a free axially outwardly directed edge adapted to engage the radially extending portion of the terminal flange 22, preferably under resiliently tensioned thrust. Each of the vanes 32 is of substantial length in a circumferential direction so as to afford a substantial opening or mouth with the lip thereof defined by the forward edge of the wall portion 34 spaced substantially from the trailing end portion of the wall portion 34 immediately forwardly therefrom. In order to enhance the effectiveness of the air moving action of the vanes 32, the axially innermost or forward edges of the vane walls 34 are angled obliquely in a forward circumferential direction, considering the vanes 32 as scoops. Moreover, the radially outer side walls 35 are preferably extended forwardly beyond the forward lips of the vane walls 34, as best seen in Figures 2 and 3.

At their axially outermost or trailing ends, the vanes 32, and more particularly the inner or crown walls 34 thereof engage the tire rim terminal flange 22 adjacent juncture thereof with the intermediate flange 21, and each of the vane walls 34 is provided with a tail flange 36 which extends as an air deflector into the mouth of the gap 23 between the body 27 of the ring and the tire rim intermediate flange 21. Thereby, it will be observed that the inner side of the gap 23 is substantially closed except for the openings provided thereinto through the aspiration-blower vanes 32. By prefernce the with of the vanes 32 is sufficiently less than the width of the terminal flange 22 so as to leave sufficient space between the axially extending portion of the terminal flange and the outer sides 35 of the vanes to accommodate wheel balancing weights 37.

Figure 2:
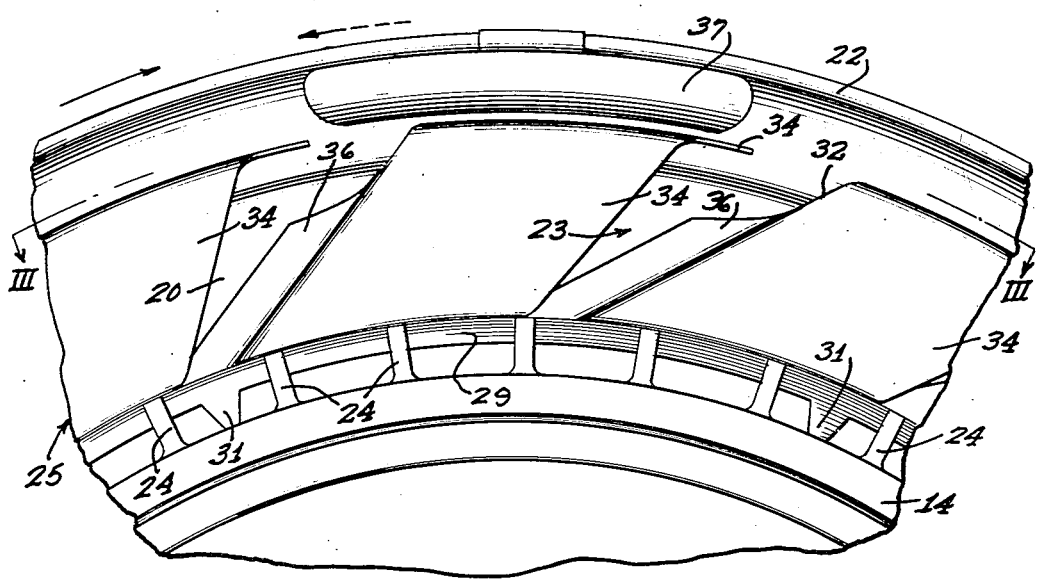
Figure 2 is a fragmentary elevational detail view looking toward the inner side of the brake drum cooling means taken substantially on the line II—II of Figure 1.
Figure 3:
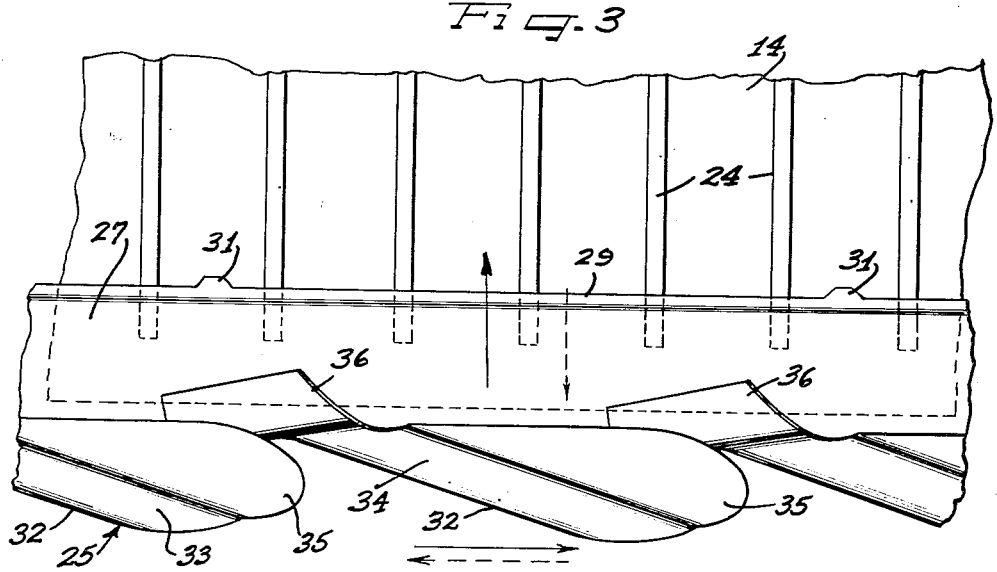
Figure 3 is a fragmentary developed plan view of the air circulation promoting means and brake drum of the present invention taken on substantially the line III—III of Figure 2.

The construction and arrangement of the ring 25 as described, is such that when the wheel with which the ring is associated rotates in the direction indicated by the solid directional arrow in Figures 2 and 3, that is, in the direction toward which the air vanes scoop members 32 open, air will be scooped in by the vane members 32 in the manner of a fan blower and pushed axially outwardly through the gap 23 in cooling relation to the brake drum 14 and out through the wheel openings 19. In such action, since the air scooping capacity of the vanes 32 is substantial, and as best seen in Figure 1, the air gap 23 diminishes gradually in cross-section toward the base flange 18 of the tire rim, thus tending to crowd the air somewhat toward the outer side of the wheel, it causes the air to develop a slight back pressure. This has the effect of assuring the movement of the air in contact with the brake drum 14 and the heat dissipating ribs 24, and also in the escape of some of the air axially inwardly between the ribs 24 past inner edge of the ring flange 30 and inwardly through the gap between the brake drum and the ring body 27, as indicated by the solid line directional arrows in Figure 1. Most of the air, however, will pass on outwardly through the wheel openings 19.

If the cooling ring 25 is applied to the wheel in such manner that in the forward rotation of the wheel the ring rotates in the direction of the broken line arrow in Figures 2 and 3, air will be motivated through the wheel in the direction of the broken line flow arrows in Figures 1, 2 and 3. That is, an aspirating action takes place wherein air is drawn from the outer side of the wheel through the wheel openings 19 and then on through the gap 23 and out through the vane members 32, thus sweeping the brake drum 14 and the brake drum fins 24 in cooling relation. Since the wheel opening 19 and the immediately adjacent portion of the gap 23 are of somewhat restricted cross sectional flow area, in relation to the large capacity aspirating effect of the louver-vane 32, additional cooling air may be drawn in through the gap between the ring body 27 and the brake drum 14 and past the flange 29 of the ring, substantially as shown in Figure 1 by the broken line directional arrow.

For ornamentally and protectively covering the outer side of the wheel, a wheel cover 40 may be provided which, in the present instance is of the full disk type of a diameter to substantially fully cover the outer side of the wheel including the wheel body 5 and the tire rim 7.

In the present instance the cover 40 comprises a crown portion 41 of a diameter to overlie the central and nose portions of the body 5 and having marginally at juncture with a divergently related outer annular cover portion 42 a generally radially inwardly and preferably slightly axially outwardly directed annular return-bent resilient cover retaining fold flange structure 43 constructed and arranged to engage in snap-on pry-off relation with retaining bumps 44 at the radially outer side of the nose bulge 15. Such an arrangement of cover retaining bumps is subject matter of my issued Patent 2,445,330, dated July 20, 1948.

From the juncture rib fold 43, the radially outer cover portion 42 extends generally radially and axially outwardly in overlying spaced relation to the outer side of the tire rim and has a terminal underturned reinforcing and finishing flange 45 which lies in substantial gap relation to the outer terminal flange portion of the tire rim so as to enable free air circulation between the cover and the tire rim.

For enhancing air circulation movement through the wheel, in cooperation with the air circulation promoting ring member 25, the cover 40 is preferably provided with a series of air circulation promoting vanes 47 of wing-like flange structure struck out from the cover portion 42 and providing apertures 48 in the cover. The vanes 47 are angularly disposed within the space between the cover and the tire rim in complementary air motivating relation to the vanes 32 of the cooling ring 25. That is, the vanes 47 are disposed to scoop or draw air into the gap between the cover and the tire rim in the direction of the broken line flow arrows of Figure 1 when the cooling ring 25 is rotated in the direction of the broken line directional arrows of Figures 2 and 3 during which the vanes 32 have an aspirating effect. On the other hand, when the vane member 25 is rotated in the direction of the solid directional arrows in Figures 2 and 3 so that movement of air is in the direction of the solid flow arrows in Figures 1, 2 and 3, the cover vanes 47 cooperate to produce an aspirating effect in the gap between the cover and the tire rim so as to assist in moving the air toward the outer side of the wheel. In these air moving actions of the cooling ring and the cover, the substantial openings 48 in the cover portion 42 afford additional air inlet or outlet, as the case may be.

It will be understood that modifications and variations may be effected without departing from the scope of the novel concepts of the present invention.

I claim as my invention:

1. In a wheel structure including a wheel assembly having a tire rim and a brake drum encircled by the tire rim in air gap relation, a coling ring member having a portion thereof engageable with the brake drum and a series of vane members angled from a portion axially inwardly from the drum-engaging portion and extending across the inner side of said air gap and cooperating with the tire rim to move air into said gap when the wheel with the ring thereon is rotated in one direction and to aspirate air from said gap when the wheel with the ring is rotated in the opposite direction.

2. In a wheel structure including a tire rim and a brake drum disposed concentrically within the inner side of the tire rim in air gap relation, an air coling ring member having a body portion and air circulation promoting vane structures thereon extending across the inner side of said gap, said vane structures including radially inner and outer side walls directed generally axially outwardly and a generally axially facing inner wall obliquely related to the tire rim and having a generally circumferentially and axially inwardly directed mouth lip obliquely disposed across said gap.

3. In a wheel structure including a tire rim and a brake drum disposed concentrically within the inner side of the tire rim in air gap relation, an air cooling ring member having a body portion and air circulation promoting vane structures thereon extending across the inner side of said gap, said vane structures including radially inner and outer side walls directed generally axially outwardly and a generally axially facing inner wall obliquely related to the tire rim and having a tail portion engageable with the tire rim and provided with a flange directed generally axially outwardly and obliquely into the gap between the tire rim and the brake drum.

4. In a wheel structure including a tire rim and a brake drum disposed concentrically within the inner side of the tire rim in air gap relation, an air cooling ring member having a body portion and air circulation promoting vane structures thereon extending across the inner side of said gap, said vane structures including radially inner and outer side walls directed generally axially outwardly and a generally axially facing inner wall obliquely related to the tire rim and having a tail portion engageable with the tire rim and provided with a flange directed generally axially outwardly and obliquely into the gap between the tire rim and the brake drum, said flange being angled circumferentially.

5. In a cooling ring for disposition across the gap between a tire rim and a brake drum at the inner side of a vehicle wheel, a body ring portion having thereon and projecting generally radially therefrom a series of circumferentially spaced obliquely disposed air moving vane structures having radially inner and outer generally axially outwardly extending side walls and an axially facing intermediate obliquely disposed air vane wall overlying the gap between the tire rim and the brake drum with the opposite circumferentially facing ends of the vane wall obliquely angled in one circumferential direction.

6. In a cooling ring for disposition across the gap between a tire rim and a brake drum at the inner side of a vehicle wheel, a body ring portion having thereon and projecting generally radially therefrom a series of circumferentially spaced obliquely disposed air moving vane structures having radially inner and outer generally axially outwardly extending side walls and an axially facing intermediate obliquely disposed air vane wall overlying the gap between the tire rim and the brake drum with the opposite circumferentially facing ends of the vane wall obliquely angled in one circumferential direction and with a tail flange on the end of the vane wall disposed nearest the tire rim angled to extend into the gap between the tire rim and the brake drum to serve as an air baffle.

7. In a ring member for disposition at the inner side of the gap between tire rim and a brake drum, a ring body having thereon air motivating vane members including a generally axially inwardly and obliquely angled vane wall with an axially outwardly angled side wall projecting in circumferential direction beyond the edge defined by the axially innermost end of the vane wall.

8. In a wheel structure including a brake drum having generally axially extending peripheral ribs providing shoulder projections thereon, a ring member for disposition in cooling relation about the brake drum and having a ring body for cooperation with the projections and having a flange extending generally radially inwardly and provided with spaced generally radially inwardly and outwardly oblique retaining fingers engageable between certain of the ribs against the brake drum for retaining the ring against axially outward displacement from the brake drum.

9. In a wheel structure including a brake drum having generally radially extending peripheral cooling fins with radially outwardly directed projections therefrom at their axially inner end portions, a cooling ring member having a circular body engageable about said projections and a generally radially inwardly directed flange engageable with the axially outwardly facing portions of said projections serving as stops to limit axially inward disposition of the ring on the drum.

10. In a wheel structure including a brake drum having generally radially extending peripheral cooling fins with radially outwardly directed projections therefrom at their axially inner end portions, a cooling ring member having a circular body engageable about said projections and a generally radially inwardly directed flange engageable with the axially outwardly facing portions of said projections serving as stops to limit axially inward disposition of the ring on the drum, said fins tapering toward the axially outer end of the brake drum to facilitate axial inward assembly movement of the ring flange thereover.

11. In combination in a vehicle wheel having a wheel body and a tire rim with air circulation openings therebetween and with a brake drum axially inwardly from the wheel body and in gap relation with an axially inner portion of the tire rim, an air circulation promoting sheet metal ring member assembled with the tire rim and the brake drum and having shoulder means thereon engaging in tensioned relation with shoulder means on the drum at said gap, with air motivating vanes on said ring member for effecting air circulation through said gap in the rotation of the wheel, and a cover mounted over the outer side of the wheel including said wheel body and the tire rim and being in air gap relation to the tire rim for movement of air through such air gap and the wheel openings, and the cover having projecting therefrom into the gap between it and the tire rim a series of air motivating vanes for cooperation with the air motivating vanes of said ring to accelerate movement of air through the wheel openings and the drum-tire rim gap in the rotation of the wheel in service.

12. In a wheel structure including a wheel body carrying a tire rim about the periphery thereof and including a brake drum at the axially inner side of the wheel body and defining with the axially inner portion of the tire rim an air circulation gap, a sheet metal cooling ring mounted at the axially inner side of said gap and having a portion thereof encircling the brake drum in engaged relation and normally liable to torque induced turning on the brake drum, and circumferentially facing shoulder means on the cooling ring portion and the brake drum in opposed relation and operative to hold the ring against said turning.

References Cited in the file of this patent

UNITED STATES PATENTS

| | | |
|---|---|---|
| D. 170,952 | Sinclair | Nov. 24, 1953 |
| 2,143,950 | Kliesrath | Jan. 17, 1939 |
| 2,331,259 | Whitten | Oct. 5, 1943 |
| 2,441,008 | Chase | May 4, 1948 |
| 2,659,459 | Lyon | Nov. 17, 1953 |
| 2,659,460 | Lyon | Nov. 17, 1953 |
| 2,687,192 | Butterfield | Aug. 4, 1954 |